Patented June 23, 1942

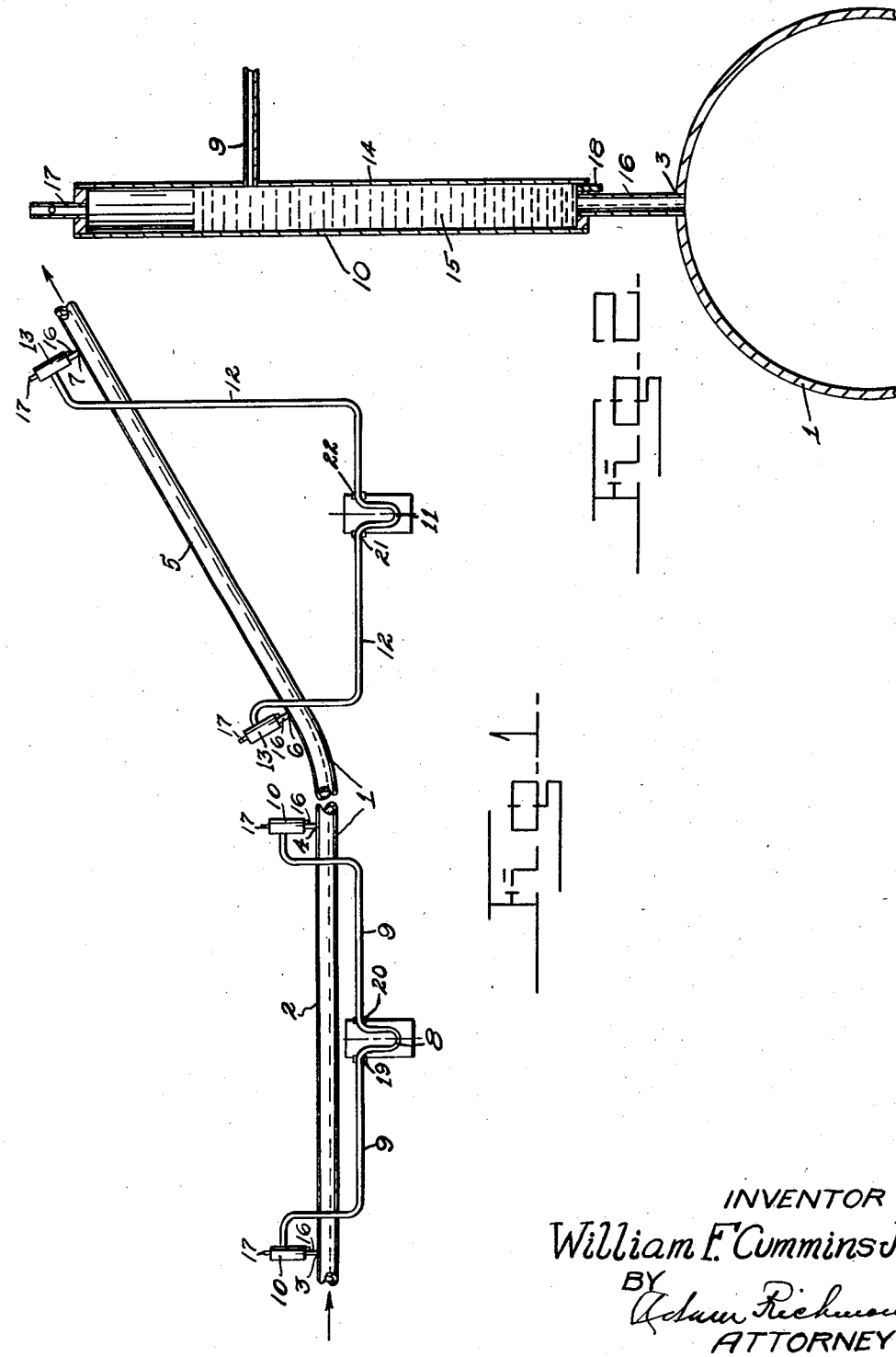

2,287,027

UNITED STATES PATENT OFFICE 2,287,027

METHOD OF AND APPARATUS FOR DETERMINING THE DENSITY OF MATERIALS

William F. Cummins, Jr., Fort Peck, Mont.

Application February 11, 1939, Serial No. 255,904

4 Claims. (Cl. 265—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method of and apparatus for determining the density of materials, particularly it is directed to a method of and apparatus for determining the mean density of materials or a mixture of materials being transported through pipelines or other conduits.

One of the objects of the invention is to provide a method of and apparatus for determining the mean density of fluids or of a mixture of fluids and solid particles flowing in a conduit by measuring the differential pressure between points in equivalent sections of conduits having different degrees of inclination and in which equal friction losses occur under the same condition of flow, thereby eliminating the friction loss factor in determining the density of the fluids or the mixture of fluids and solid particles.

Another object of the invention is to provide a method of and apparatus for determining the percentage of one material in a mixture of two materials flowing through a conduit, when the density of each material in the mixture is known by measuring the differential pressures between points in equivalent sections of conduit having different degrees of inclination.

In the operation of the pipelines which are used for the transportation of fluids or a mixture of water and solids, for example, as practiced by the pipeline dredge operator, it is desirable to know at all times the density of fluids or the density of a mixture of fluid and solids passing a given station. Without this information as a guide, the amount of solids may become so concentrated that they will, by force of gravity, drag along the bottom of the pipeline in such a manner as to cause excessive wear in the pipeline and a low output of solids. In addition, a stream when greatly burdened with solids, may at any time, due to a slight change in conditions, plug the line with solid material, thus stopping the operations.

Heretofore the amount of solids flowing through a pipeline was determined in only a straight section of pipe by detecting the velocity of fluids or solids flowing through the pipeline or by the friction loss in the pipeline.

It is therefore the aim and purpose of this invention to provide a method of and apparatus for determining the mean density of materials flowing in a conduit, which materials may be either fluids or a mixture of fluid and solid particles also to determine the percentage of one material in a mixture of two materials flowing through a conduit by measuring the differential pressure between points in equivalent sections of the conduit having different degrees of inclination, independent of the velocity of flow of the fluid or materials and the amount of friction loss in the conduit.

With the above and other objects and advantages in view, the invention consists in certain features of construction and operation of parts which will hereinafter appear, and in which—

Fig. 1 is a side elevation of a pipeline embodying the invention; and

Fig. 2 is an enlarged vertical section of a separating device used in carrying out the invention.

In the illustrated embodiment characterizing the invention 1 indicates a pipeline which may be a portion of a discharge conduit used in connection with hydraulic dredge operations and through which fluids or fluids and solids are transported. The pipeline 1 has a substantially horizontal section 2 which is tapped at points 3 and 4 and another section 5 which is bent at an angle to the horizontal section 2 and tapped at points 6 and 7. A device 8 for measuring differential pressure of the fluid or mixture of fluid and solid particles flowing in the section 2 of the pipeline 1 is connected by conduits 9 of equal length to separating tanks 10, one of each of which is in turn connected by a short conduit 16, at one of each of the tapped points 3 and 4 respectively, provided on the section 2 of the pipeline. Another device 11 for measuring the differential pressure of the fluid or mixture of fluid and solid particles flowing in the section 5 of the pipeline is connected by conduits 12 of equal length, to separating tanks 13, one of each of which is in turn also connected by a short conduit 16, at one of each of the tapped points 6 and 7 respectively, provided on the section 5 of the pipeline. A fluid of known density is used to fill the conduits 9 and 12, which fluid only transmits pressure to the differential pressure measuring devices. The separating devices 10 and 13 are used for the purpose of preventing the material which is flowing through the pipeline 1 from mixing with the fluid which fills the conduits 9 and 12.

The separating devices 10 for the section 2 of the conduit 1 are caused to receive some of the fluid or a mixture of fluids and solid particles of different densities which has been forced into the separating devices 10. The density of the fluid or solid particles forced into the separating device 10 at point 4 of the section 2 of the conduit being greater than the density of the fluid or mixture of fluids and solid particles which has been forced into the separating device 10 at point 3 of the section 2 and the separating devices 13 are adapted to receive some of the fluid or the mixture of fluid and solid particles of different densities at points 6 and 7 on the section 5 of the conduit 1, the density of the portion of fluid or mixture of fluid and solid particles forced into the separating device 13 at point 6 of the section 5 of the conduit being greater than the density of the fluid forced into the separating device 13 at point 7 of the section 5, because gravity will tend to hold the fluid or the mixture of fluids and solid particles of greater density at the place where the two sections 2 and 5 are inclined to each other. These separating devices 10 and 13 are in the form of tanks 14 containing a fluid or mixture 15 of unknown density which fills the tanks to substantially the same height above their points of connections with the pipeline 1, as illustrated in Fig. 2. Small differences in height will introduce only negligible errors in results. In order to allow any air which should enter the tanks 10 and 13 to escape into the atmosphere a valved air vent 17 is provided in the upper end of the tanks. To clean out the tanks 10 and 13 a plug 18 may be inserted in the bottom thereof.

The introduction of any fluid or mixture of fluid and solid particles into the tanks 10 and 13 from the pipeline 1, through the conduits 16 is not at all necessary as any suitable means, which would prevent the fluid or fluid and solid particles in the pipeline, from entering the conduits 9 and 12 leading to the differential pressure measuring devices 8 and 11 would be satisfactory for the purpose intended. The admission of the fluid or mixture of fluid and solid particles into the tanks 10 and 13 from the pipeline 1, is merely incidental to the operation of the differential pressure measuring devices.

The left and right pressure sides of the differential pressure measuring devices 8 and 11 are indicated by the numerals 19, 20, 21 and 22, respectively.

The differential pressure measuring devices 8 and 11 may be differential manometers, diaphragm gauges, or any other means for measuring the pressure difference between two points. Likewise, either the section 2 of pipeline 1 between points 3 and 4 or the section 5 thereof between points 6 and 7, or both, may be inclined. The inclination of the two sections 2 and 5 of the pipeline 1, relative to each other must be such that the devices 8 and 11 will indicate differential pressures, which differ from each other by an amount sufficient for the density of the material in the pipeline to be determined with the required degree of accuracy. This is accomplished by inclining the two sections 2 and 5 of the pipeline 1 a sufficient amount with respect to each other, such that the points of connections of the conduits 9 abut the section 2 of the pipeline, for the differential measuring device 8 and the points of connections of the conduits 12 with the section 5 of the pipeline are at a substantially different elevation, thereby causing a difference in the readings of the two differential measuring devices of sufficient magnitude to enable the densities of the material flowing in the pipeline 1 to be determined with the desired degree of accuracy.

The principle of operation depends upon the fact that, in an inclined section of pipeline through which a material is being transported at a uniform velocity, the difference in pressure between two points along the section will vary with the inclination of the section, the friction loss and with the density of the material between those points. If the sections 2 and 5 of the pipeline 1 between points 3 and 4 and between points 6 and 7 have different degrees of inclination but are of equal length, diameter and inside surface roughness, and if the velocity distribution is similar in both these sections, the difference between the differential pressure indicated by 8 and by 11 will depend upon the density of the material flowing in the pipeline 1.

After the conduits 9 and 12 and tanks 10 and 13 are filled, only a slight oscillating flow occurs as the pressure in the pipeline fluctuates. The conduits 9 and 12 transmitting pressure only to the differential pressure measuring devices 8 and 11 and since there is no flow through them, the column of fluid such as water in the tanks keep practically all solid particles settled out and the water in the top of the tanks and in the conduits 9 and 12 remain practically clear.

If it is desired to measure the mean density of a liquid only, instead of a mixture such as is encountered in dredge pipelines, a liquid of known density, which is not miscible with the liquid being measured and which has a density less than that of the lowest density or higher than that of the highest density of the liquid being measured, can be used in the conduits 9 and 12 and in the tanks 10 and 13. For instance, if the liquid flowing in the pipeline 1 is an aqueous solution, the top portion of the separating tanks and the connecting conduits can be filled with a light oil. If the liquid in the pipeline was some oil which was lighter than water, the tanks could be inverted and water used to fill the lower portion of the tanks and the connecting conduits 9 and 12. If a mixture of solid particles with a fluid of known density, such as water, is being transported, and if the specific gravity of the solid particles is known, the percentage of solids in the mixture can be determined. This is of use in connection with the operation of pipeline dredges and other systems where the solids are mixed with water and transported through pipelines.

Referring to Fig. 1, assume the direction of flow in pipeline 1 to be to the right in the direction of the arrows, and let—

$p_{19}$=pressure on side of differential pressure measuring instrument 8 connected to point 3
$p_{20}$=pressure on side of differential pressure measuring device 8 connected to point 4
$p_3$=pressure in pipeline at point 3
$h_3$=difference in elevation of point 19 and 3
$h_4$=difference in elevation of point 20 and point 4;

likewise let $p_{21}$=pressure on side of differential pressure measuring instrument 11 connected to point 6
$P_{22}$=pressure on side of differential pressure measuring instrument 11 connected to point 7
$p_7$=pressure in pipeline at point 7
$h_6$=difference in elevation of point 21 and point 6
$h_7$=difference in elevation of point 22 and point 7;

also let $p_f$ = drop in pressure between point 3 and point 4 and between point 6 and point 7, due to losses in the pipeline 1

$d_s$ = density of material in conduits 9 and 12
$d_x$ = density of material in pipeline 1

$p_{19} = p_3 + h_3 d_s$
$p_{20} = p_3 - p_f + h_4 d_s + (h_3 - h_4) d_x$
$p_{19} - p_{20} = h_3 d_s + p_f - h_4 d_s - (h_3 - h_4) d_x$
$\quad = p_f + (h_3 - h_4) d_s - (h_3 - h_4) d_x$
$\quad = p_f - (h_3 - h_4)(d_x - d_s)$
$p_{22} = p_7 + h_7 d_s$
$p_{21} = p_7 + p_f + h_6 d_s + (h_7 - h_6) d_x$
$p_{21} - p_{22} = p_f + h_6 d_s + (h_7 - h_6) d_x - h_7 d_s$
$\quad = p_f + h_6 d_s + h_7 d_x - h_6 d_x - h_7 d_s$
$\quad = p_f + (h_7 - h_6)(d_x - d_s)$
$\therefore [(p_{21} - p_{22}) - (p_{19} - p_{20})] = (h_7 - h_6)(d_x - d_s) + (h_3 - h_4)(d_x - d_s)$
$\quad = [(h_7 - h_6) + (h_3 - h_4)][d_x - d_s]$ knowing the distances $h_3$, $h_4$, $h_6$ and $h_7$, and also the density of the fluid in conduits 9 and 12, the density of $d_x$ of the material flowing through the pipeline 1 can be determined from the readings of the devices 8 and 11 which show the differential pressures $(p_{21} - p_{22})$ and $(p_{19} - p_{20})$.

It will thus be seen that there is provided a highly useful and novel method of and apparatus for determining the density of materials or a mixture of materials transported through pipelines or other conduits. Even though there has been herein described certain features of construction and operation of parts, it is nevertheless to be understood that various changes may be made therein without departing from the spirit or scope of the invention.

Having described my invention, what I claim as new and wish to secure by Letters Patent is:

1. In an apparatus for determining the mean density of a fluid or a mixture of fluids and solid particles flowing in a pipe line, the combination of a pipe line including equivalent sections in which equal friction losses occur under the same conditions of flow, said sections having different degrees of inclination, differential pressure measuring devices, one of each of said differential pressure measuring devices being connected at spaced points between an equivalent portion of one of each of said sections, the points of connection of one of said pressure measuring devices, with one of said sections being at a different elevation than the points of connection of another of said pressure measuring devices with another of said sections.

2. The method of determining the mean density of fluids or of mixtures of fluids and solid particles flowing in a conduit including equivalent sections at an angle to each other and in which equal friction losses occur under the same condition of flow, which consists of simultaneously measuring the differential pressure of the fluids or of the mixtures of fluids and solid particles between spaced points at one elevation in one of said sections of the conduit and between spaced points at a different elevation in another of said sections of the conduit and computing the mean density of the fluids or mixtures of fluids and solid particles flowing through the conduit from the differential pressures measured.

3. In an apparatus for determining the mean density of a fluid or of a mixture of fluids and solid particles flowing in a pipeline including two equivalent sections at an angle to each other and in which equal friction losses occur under the same conditions of flow, tanks mounted at spaced points on one of said equivalent sections of the pipeline and tanks mounted at spaced points on the other of said equivalent sections of the pipeline, said tanks adapted to receive portions of said fluid or mixture of fluids and solid particles, flowing through said pipeline, a differential pressure measuring device connected in communication with the tanks on one of said sections of the pipeline and a differential pressure measuring device connected in communication with the tanks on the other of said sections of the pipeline.

4. In an apparatus for determining the mean density of fluids or of a mixture of fluids and solid particles flowing in a pipeline including two equivalent sections at an angle to each other and in which equal friction losses occur under the same conditions of flow, tanks connected at spaced points on one of said sections of said pipeline and tanks connected at spaced points on the other of said sections of the pipeline, differential pressure measuring devices, one of said differential pressure measuring devices having connections with said tanks on one of said sections of the pipeline and another of said differential pressure measuring devices having connections with the tanks on the other of said sections of the pipeline, the points of connection of said tanks on one of said sections being of a different elevation than the points of connection of the tanks on the other of said sections of the pipeline.

WILLIAM F. CUMMINS, Jr.